(12) United States Patent
Takeuchi

(10) Patent No.: US 10,976,868 B2
(45) Date of Patent: Apr. 13, 2021

(54) DETECTION DEVICE HAVING AN OPTICAL DETECTOR WITH A PROTRUSION THAT PROTRUDES FROM A DISPLAY

(71) Applicant: FUJI XEROX CO., LTD., Tokyo (JP)

(72) Inventor: Ko Takeuchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 204 days.

(21) Appl. No.: 15/934,044

(22) Filed: Mar. 23, 2018

(65) Prior Publication Data

US 2018/0292947 A1 Oct. 11, 2018

(30) Foreign Application Priority Data

Apr. 6, 2017 (JP) .............................. JP2017-075735

(51) Int. Cl.
*G06F 3/0488* (2013.01)
*G06F 3/042* (2006.01)
*H04N 1/00* (2006.01)

(52) U.S. Cl.
CPC .......... *G06F 3/0421* (2013.01); *G06F 3/0488* (2013.01); *H04N 1/00384* (2013.01); *H04N 1/00392* (2013.01); *H04N 1/00411* (2013.01); *H04N 1/00496* (2013.01); *H04N 1/00564* (2013.01); *G06F 2203/04809* (2013.01)

(58) Field of Classification Search
CPC ................. G06F 3/0488; G06F 3/0421; G06F 2203/04809; H04N 1/00384; H04N 1/00392; H04N 1/00411
USPC ................ 358/1.13, 1.18; 715/702, 970, 778
See application file for complete search history.

(56) References Cited

U.S. PATENT DOCUMENTS

| 7,903,097 | B2 | 3/2011 | Watari | |
|---|---|---|---|---|
| 2011/0193787 | A1* | 8/2011 | Morishige | G06F 3/016 345/173 |
| 2011/0304574 | A1* | 12/2011 | Harrison | G06F 3/04886 345/173 |
| 2014/0364218 | A1* | 12/2014 | Holmgren | A63F 13/213 463/31 |
| 2015/0169133 | A1 | 6/2015 | Eriksson et al. | |
| 2016/0154475 | A1 | 6/2016 | Eriksson et al. | |

FOREIGN PATENT DOCUMENTS

| JP | 2004-110643 A | 4/2004 |
|---|---|---|
| JP | 2007-65767 A | 3/2007 |

OTHER PUBLICATIONS

Nov. 10, 2020 Office Action issued in Japanese Patent Application No. 2017-075735.
Jan. 25, 2021 Office Action issued in Japanese Patent Application No. 2017-075735.

* cited by examiner

*Primary Examiner* — Jamares Q Washington
(74) *Attorney, Agent, or Firm* — Oliff PLC

(57) ABSTRACT

A detection device includes an optical detector and a controller. The optical detector includes a protrusion including light-emitting portions and light-receiving portions, and detects a position of an object of interest to be detected by receiving, with use of one or more of the light-receiving portions, reflected light that occurs when light emitted from one or more of the light-emitting portions is reflected by the object of interest to be detected. The controller performs predetermined control on the detection device in accordance with a detection result of detecting, by the optical detector, an action when a user contacts the protrusion of the optical detector.

11 Claims, 11 Drawing Sheets

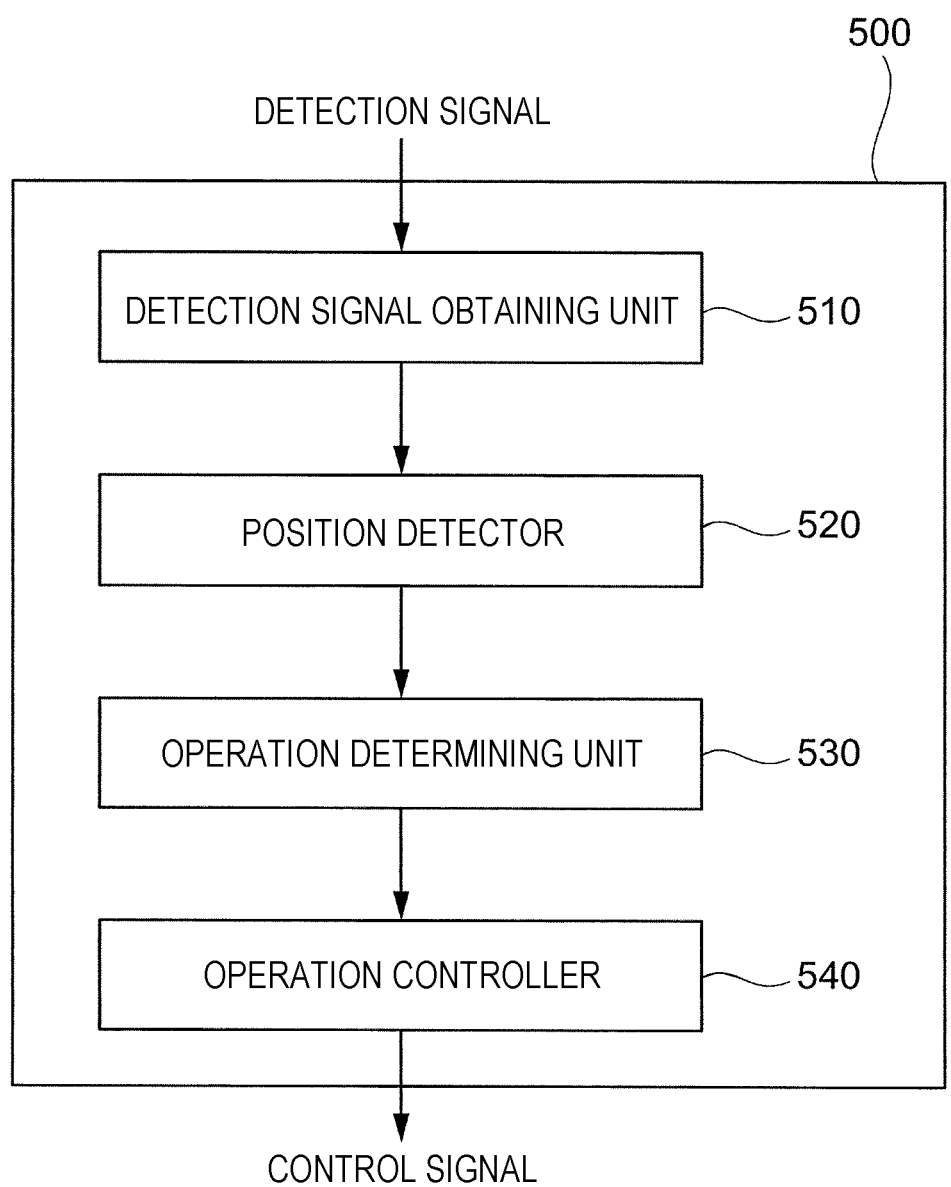

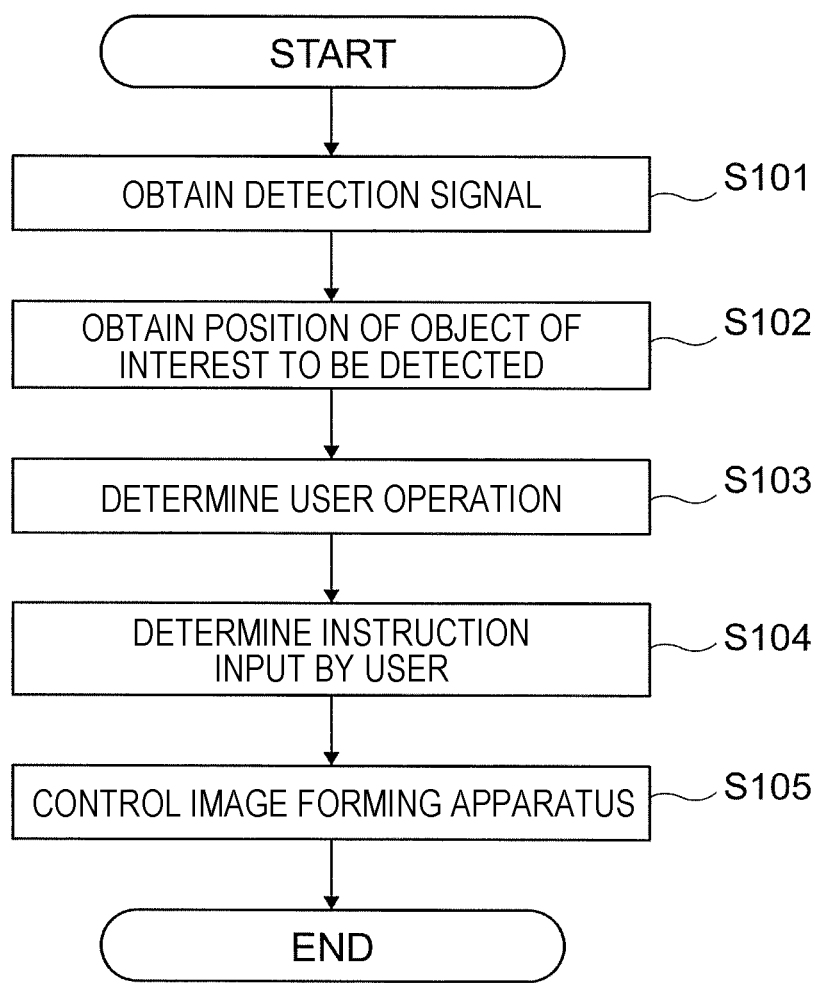

DETECTION DEVICE HAVING AN OPTICAL DETECTOR WITH A PROTRUSION THAT PROTRUDES FROM A DISPLAY

CROSS-REFERENCE TO RELATED APPLICATIONS

This application is based on and claims priority under 35 USC 119 from Japanese Patent Application No. 2017-075735 filed Apr. 6, 2017.

BACKGROUND

(i) Technical Field

The present invention relates to a detection device and an apparatus.

(ii) Related Art

A user interface of a device may be provided with, as an input unit for receiving information for operating the device, a hardware key, which is a key with a concrete form, such as a button or a switch, or a software key, which is a key displayed on a display under software control.

Meanwhile, a user interface that is provided with an optical detector for optically detecting the position of an object of interest to be detected and that receives an input from a user in accordance with the detected position of the object of interest may be used in recent years.

It is preferable for a user operation performed on the user interface to be more intuitive and simplified. Likewise, there are cases where a blind user or a user who is operating the user interface while doing another task may want to input user instructions with a more intuitive and simplified operation.

SUMMARY

According to an aspect of the invention, there is provided a detection device including an optical detector and a controller. The optical detector includes a protrusion including light-emitting portions and light-receiving portions, and detects a position of an object of interest to be detected by receiving, with use of one or more of the light-receiving portions, reflected light that occurs when light emitted from one or more of the light-emitting portions is reflected by the object of interest to be detected. The controller performs predetermined control on the detection device in accordance with a detection result of detecting, by the optical detector, an action when a user contacts the protrusion of the optical detector.

BRIEF DESCRIPTION OF THE DRAWINGS

An exemplary embodiment of the present invention will be described in detail based on the following figures, wherein:

FIG. 10 is a block diagram illustrating an exemplary functional configuration of a control device; and FIG. 11 is a flowchart illustrating the operation of the control device.

DETAILED DESCRIPTION

Hereinafter, an exemplary embodiment will be described in detail with reference to the attached drawings.

Description of Overall Configuration of Image Forming Apparatus 1

Figure 1:
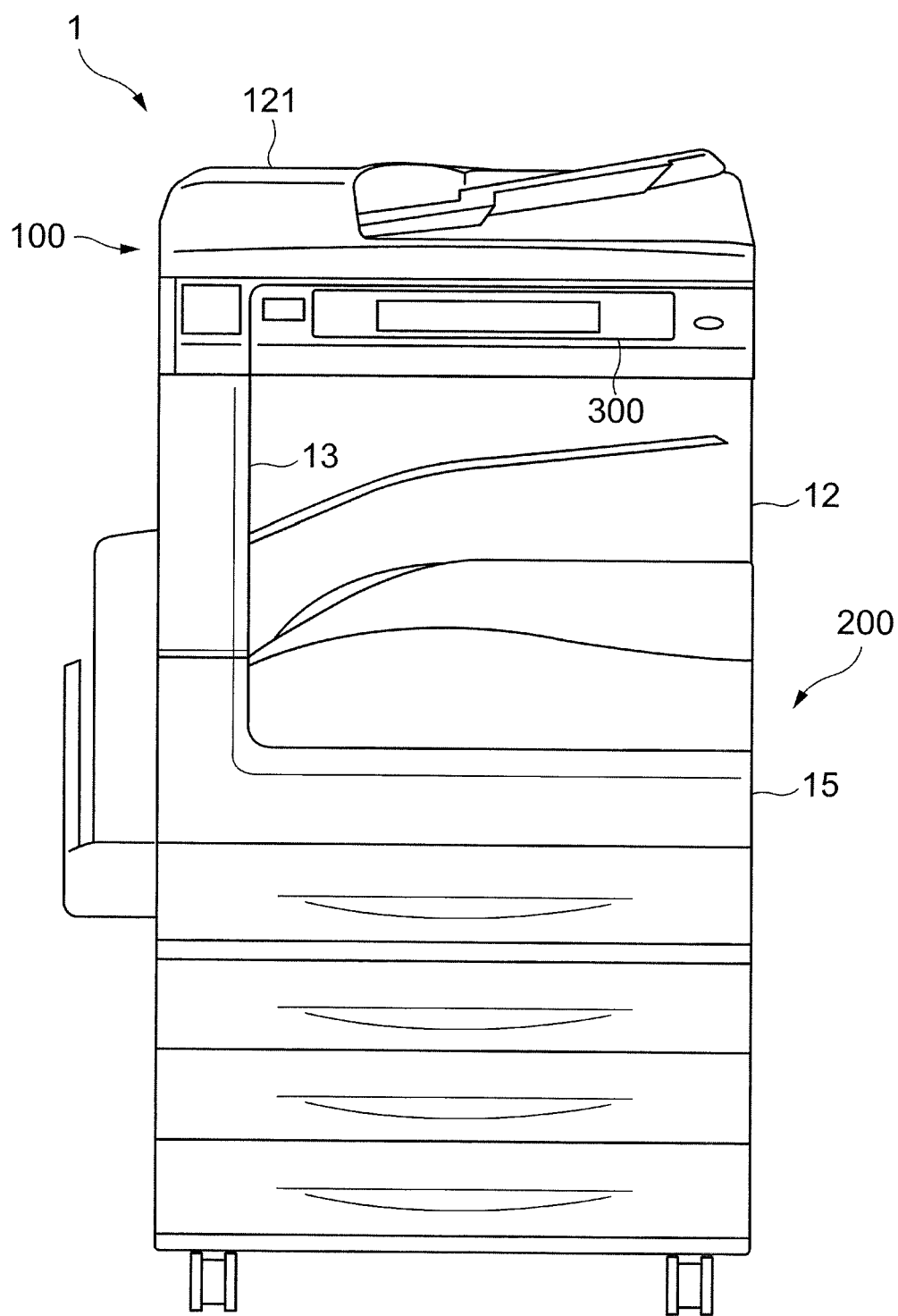
FIG. 1 is an external view of an image forming apparatus according to an exemplary embodiment.
Figure 2:
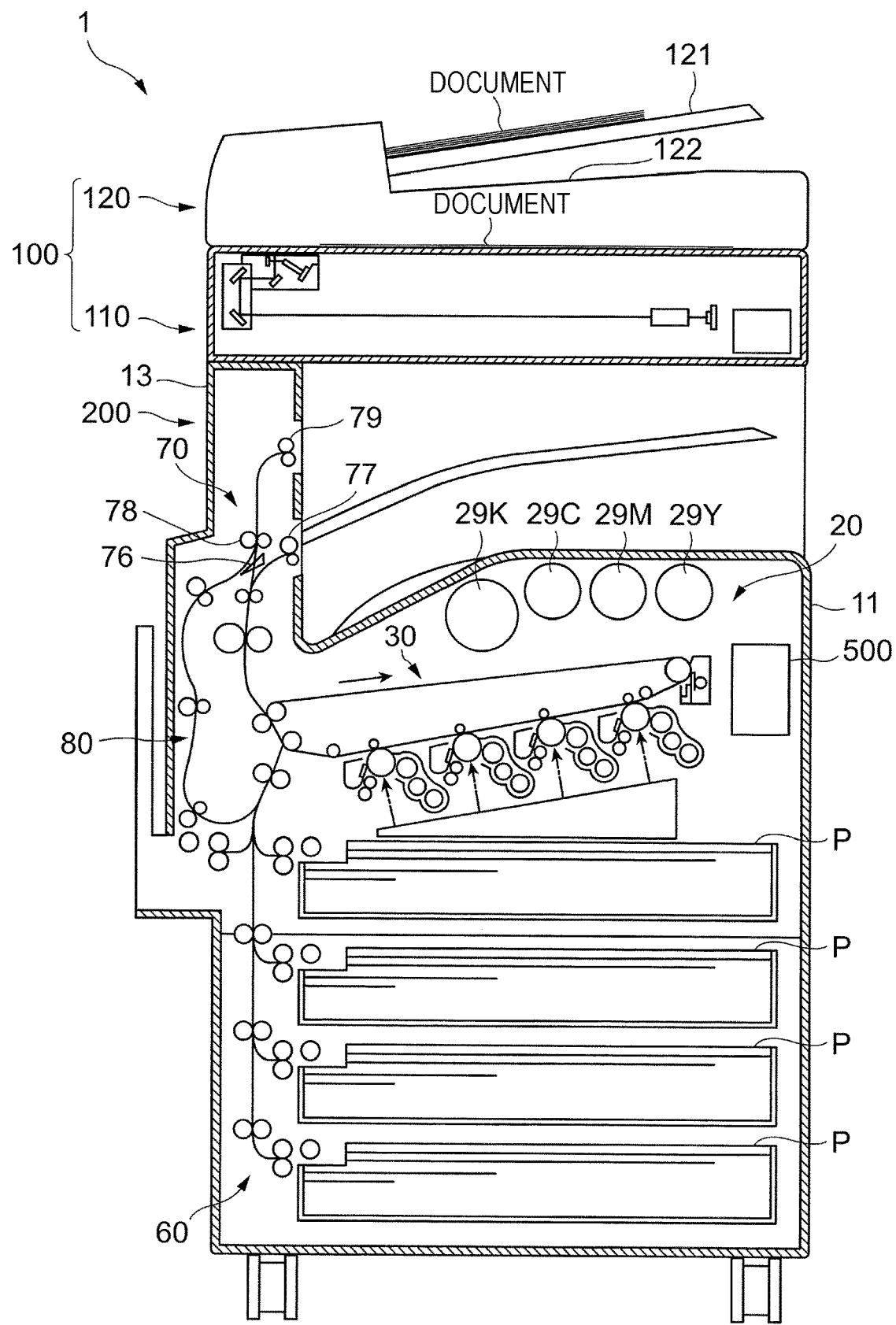
FIG. 2 is a diagram illustrating the internal configuration of the image forming apparatus according to the exemplary embodiment.

FIG. 1 is an external view of an image forming apparatus 1 according to the exemplary embodiment. FIG. 2 is a diagram illustrating the internal configuration of the image forming apparatus 1 according to the exemplary embodiment.

The image forming apparatus 1 is an example of an apparatus, and includes an image reading device 100, which reads an image of a document, and an image recording device 200, which records an image on a recording material (hereinafter may be represented as "paper"). The image forming apparatus 1 additionally includes a user interface (UI) 300, which receives an operation input from a user and displays different items of information for the user. The image forming apparatus 1 further includes a control device 500, which controls the overall operation of the image forming apparatus 1.

The image reading device 100 is arranged in an upper portion of the image forming apparatus 1, and the image recording device 200 is arranged below the image reading device 100 and contains the control device 500. The user interface 300 is arranged on the front side of an upper portion of the image forming apparatus 1, that is, the front side of a later-described image reading unit 110 of the image reading device 100.

At first, the image reading device 100 will be described.

The image reading device 100 includes the image reading unit 110, which reads an image of a document, and a document conveying unit 120, which conveys a document to the image reading unit 110. The document conveying unit 120 is arranged in an upper portion of the image reading device 100, and the image reading unit 110 is arranged in a lower portion of the image reading device 100.

The document conveying unit 120 includes a document accommodation unit 121, which accommodates a document, and a document ejection unit 122, to which the document conveyed from the document accommodation unit 121 is ejected. The document conveying unit 120 conveys a document from the document accommodation unit 121 to the document ejection unit 122. The document conveying unit 120 is also referred to as an auto-document feeder (ADF).

Next, the image recording device 200 will be described.

The image recording device 200 includes an image forming unit 20, which forms an image on paper P, a paper supplying unit 60, which supplies paper P to the image forming unit 20, a paper ejecting unit 70, which ejects paper P on which an image has been formed by the image forming unit 20, and a turn-over conveying unit 80, which turns over paper P where an image has been formed on one side by the image forming unit 20 and again conveys the paper P toward the image forming unit 20.

Description of Operation of Image Forming Apparatus 1

The image forming apparatus 1 configured as described above operates as follows.

For example, the user is able to photocopy a document using the image forming apparatus 1. That is, a document may be photocopied on the basis of image data of the document read by the image reading device 100 by forming an image on paper P with the use of the image recording device 200. The user is also able to print a document by transmitting a print job to the image forming apparatus 1 from, for example, a personal computer (PC) (not illustrated) connected to a communication link. That is, a document may be printed by receiving a print job through a communication link, and, on the basis of image data included in the print job, forming an image on paper P with the use of the image recording device 200. The user is further able to transmit and receive faxes. That is, image data of a document read by the image reading device 100 may be transmitted through a communication link. Alternatively, the user is able to save image data of a document. That is, image data of a document may be saved in the image forming apparatus 1 or in a PC connected to a communication link.

Description of User Interface 300

Figure 3A:
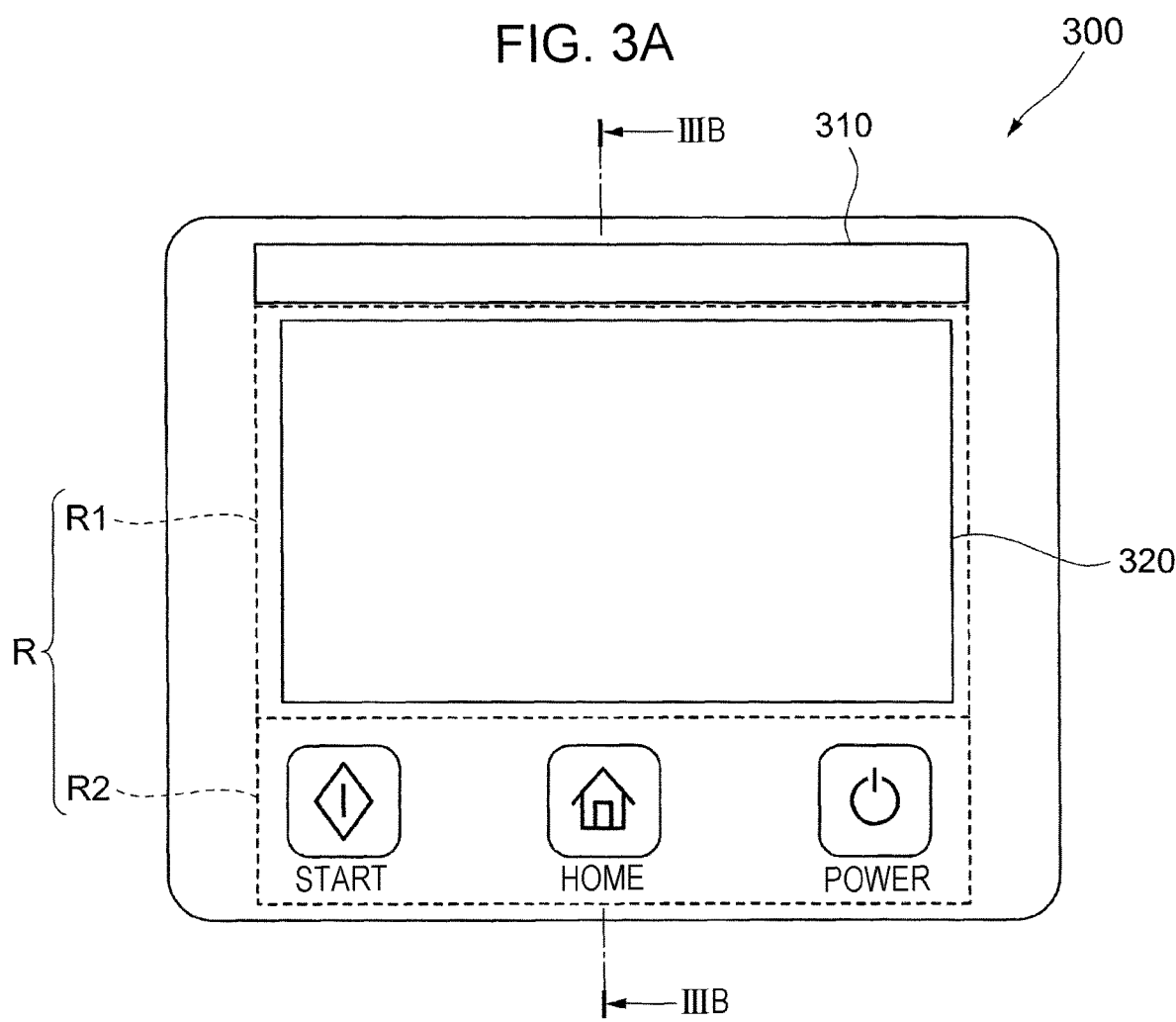
FIG. 3A is a diagram illustrating an exemplary user interface.
Figure 3B:
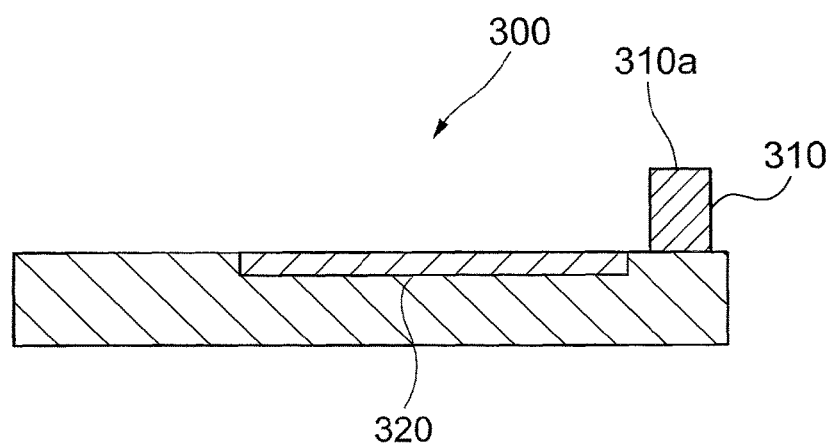
FIG. 3B is a cross-sectional view taken along line IIIB-IIIB of the user interface illustrated in FIG. 3A.

FIG. 3A is a diagram illustrating an example of the user interface 300. FIG. 3B is a cross-sectional view taken along line IIIB-IIIB of the user interface 300 illustrated in FIG. 3A.

As illustrated in FIG. 3A, the user interface 300 includes an optical detector 310, which optically detects an object of interest to be detected, and the display 320, which displays an image.

The optical detector 310 is also referred to as, for example, an optical sensing bar, and detects the position of an object of interest to be detected. When the user tries to operate the user interface 300, for example, if the user is operating the user interface 300 with a finger, the optical detector 310 detects this finger as an object of interest to be detected. The optical detector 310 is able to detect anything other than the user's finger as long as that thing touches the user interface 300. Therefore, for example, an object of interest to be detected may be a stylus or the like.

Figure 4:
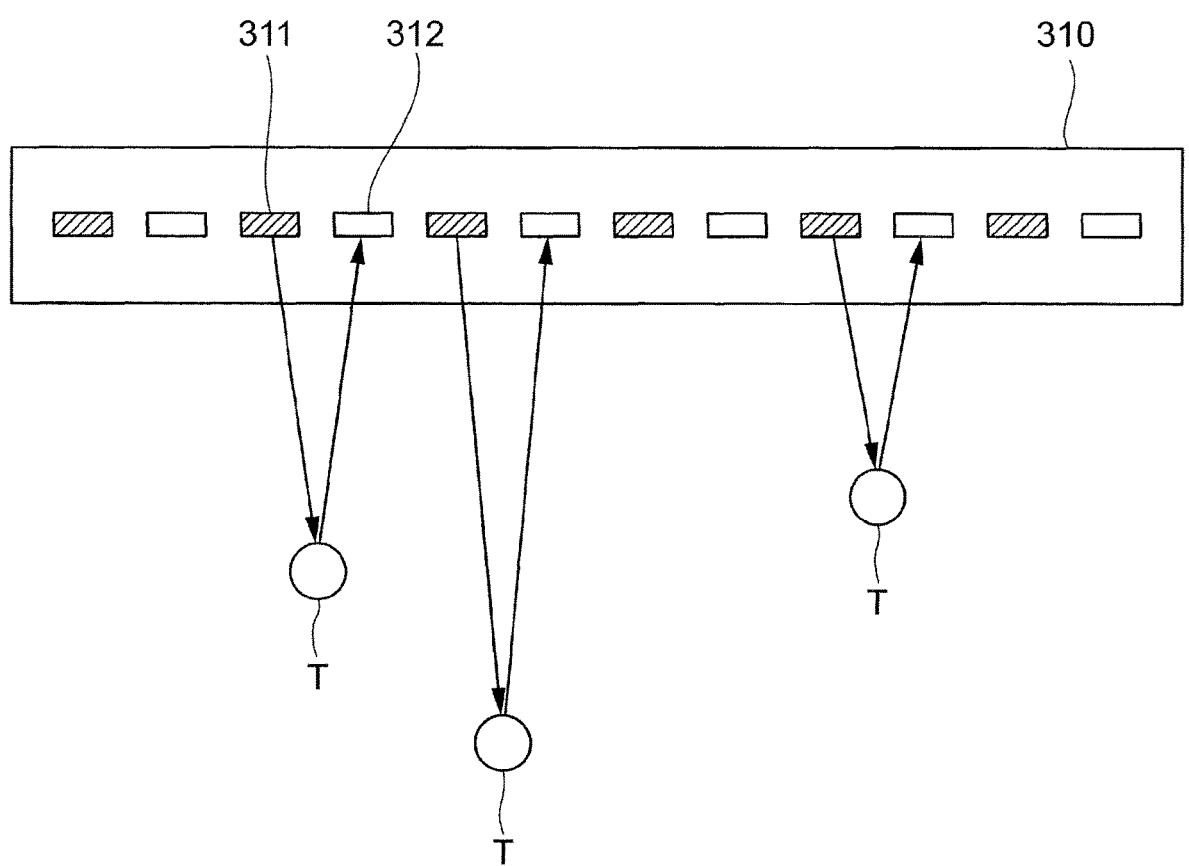
FIG. 4 is a diagram illustrating a method of detecting an object of interest to be detected with the use of an optical detector.

FIG. 4 is a diagram illustrating a method of detecting an object T of interest to be detected with the use of the optical detector 310.

As illustrated in FIG. 4, the optical detector 310 includes light-emitting portions 311, which emit light, and light-receiving portions 312, which receive light.

Each light-emitting portion 311 includes a light-emitting diode (LED) or the like, and emits infrared light or the like.

Each light-receiving portion 312 includes a photodiode (PD) or the like, and receives light reflected from the object T of interest to be detected. Each light-receiving portion 312 outputs a detection signal in accordance with this reflected light.

As illustrated in FIG. 4, the light-emitting portions 311 and the light-receiving portions 312 are alternately arranged in line.

With this configuration, the optical detector 310 is able to detect the position of an object T of interest to be detected by receiving, with the use of one or more of the light-receiving portions 312, reflected light that occurs when light emitted from one or more of the light-emitting portions 311 is reflected by the object T of interest. This is, so to speak, the optical detector 310 being able to detect a two-dimensional position that is the position of an object T of interest to be detected in the vertical and horizontal directions. In other words, the horizontal position of the object T of interest to be detected in FIG. 4 is detectable by determining whether which of the light-receiving portions 312 has received the reflected light. The vertical position of the object T of interest to be detected in FIG. 4 is detectable in accordance with the intensity of light received by the light-receiving portion(s) 312. That is, the closer the object T of interest to be detected is to the optical detector 310, the greater the intensity of light received by the light-receiving portion(s) 312. In contrast, the farther the object T of interest is from the optical detector 310, the weaker the intensity of the light received by the light-receiving portion(s) 312. Therefore, because the distance between the optical detector 310 and the object T of interest is detectable from the intensity of the light received by the light-receiving portion(s) 312, the position of the object T of interest to be detected in the vertical direction of FIG. 4 is accordingly detectable. Furthermore, even if there are multiple objects T of interest to be detected, the optical detector 310 is able to detect the individual objects T of interest. Accordingly, so-called multi-touch is detectable.

As illustrated in FIG. 3B, the optical detector 310 includes a protruding protrusion 310a on a face where the display 320 of the user interface 300 is provided. The light-emitting portions 311 and the light-receiving portions 312, illustrated in FIG. 4, are arranged on the protrusion 310a. Out of light emitted from the light-emitting portions 311, light that progresses along the face where the display 320 of the user interface 300 is provided hits an object T of interest to be detected and is reflected, thereby becoming reflected light. Out of the reflected light from the object T of interest, light that progresses along the face where the display 320 is provided is received by one or more of the light-receiving portions 312.

The display 320 is, for example, a liquid crystal panel, and displays information regarding the image forming apparatus 1 as an image. As illustrated in FIG. 3A, the display 320 is rectangular, and one optical detector 310 is arranged along one side of the display 320. Here, the optical detector 310 is arranged along the top side of the display 320.

In the exemplary embodiment, a first detection region R1 and a second detection region R2 are provided as detection regions for detecting an object of interest with the use of the optical detector 310.

The first detection region R1 is a region that is provided at a position closer to the optical detector 310 and that is for detecting the movement of an object T of interest to be detected with the use of the optical detector 310.

Here, the first detection region R1 includes the region of the display 320, as illustrated in FIG. 3A. Therefore, the optical detector 310 is able to detect, in the first detection region R1, an operation performed by the user on an image displayed on the display 320.

In this case, because the optical detector 310 is able to detect the movement of the object T of interest on the display 320, the optical detector 310 is able to detect, in the first detection region R1, not only the presence of a touch but also an action accompanying a touch as an operation performed by the user on the display 320. An action accompanying a touch is specifically an operation such as dragging and swiping performed by the user on the display 320. That is, when the optical detector 310 detects an object of interest at a certain position on the display 320, it is determined that the user has touched the detected position on the display 320. Furthermore, when the detected position moves, it is determined that the user has performed an operation such as dragging or swiping on the display 320.

Figure 5:
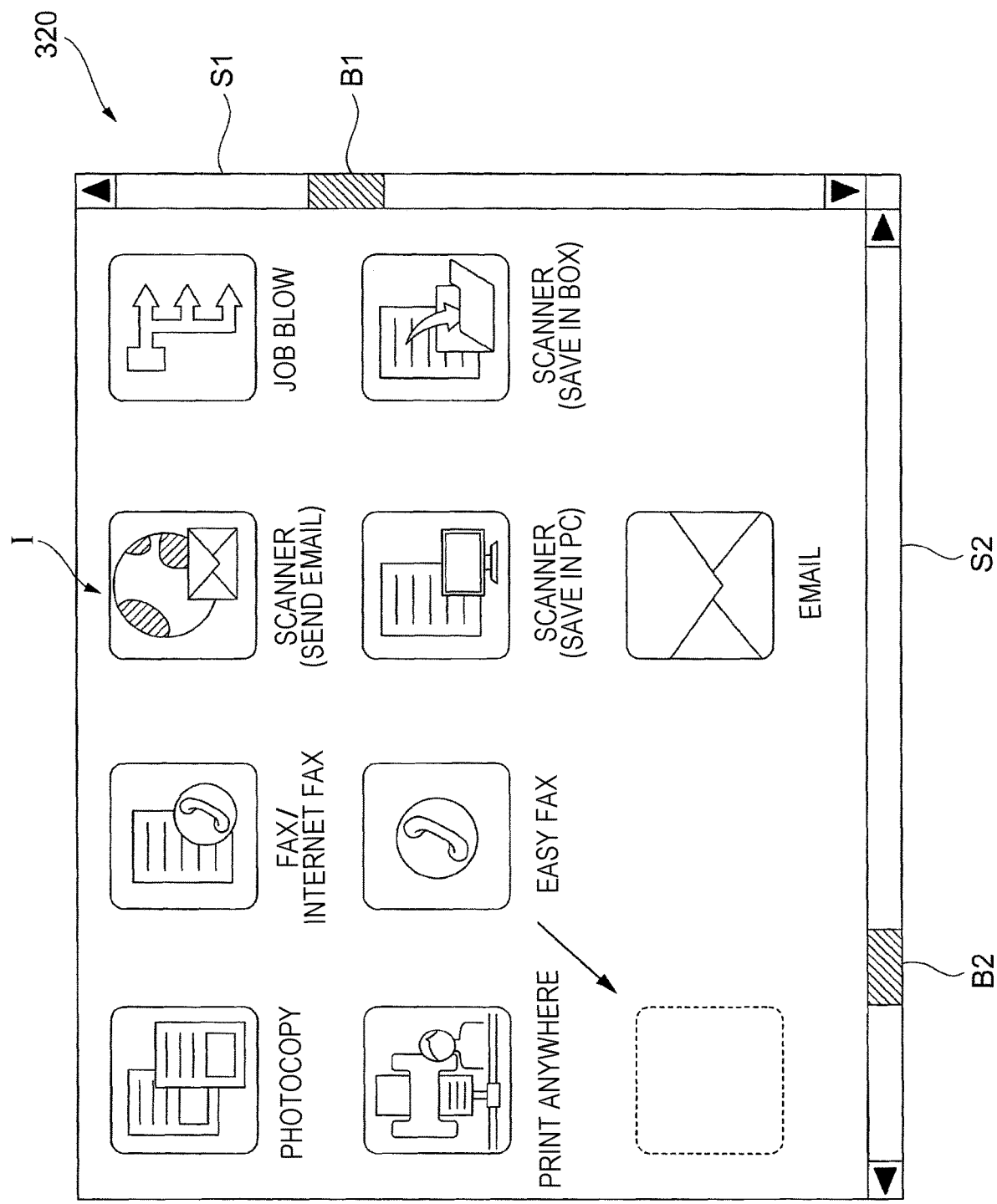
FIG. 5 is a diagram illustrating a specific example of an operation performed by a user on a display.

FIG. 5 is a diagram illustrating a specific example of an operation performed by the user on the display 320.

Here, a list of icons I for executing functions included in the image forming apparatus 1 is displayed as an image on the display 320. This image is a so-called home screen. The icons I displayed here are respectively associated with predetermined processes, and, when one of the icons I is selected, a process associated with the selected icon I is executed.

In the example illustrated in FIG. 5, the display 320 displays the icons I representing the following functions: photocopy, fax/Internet fax, scanner (send email), job flow, print anywhere, easy fax, scanner (save in PC), scanner (save in box), and email.

To use a function that the user wants to use, the user performs an operation to touch a corresponding one of the icons I. When the user touches one of the icons I, for example, a setup screen corresponding to the function associated with the icon I is displayed. For example, when the user touches the icon I of "photocopy", the following setup screen for photocopying a document is displayed: a screen for selecting the number of copies, the type of paper to be used, and whether to perform monochrome or color printing, and setting the scale for enlargement or size reduction.

When the user performs an operation to drag one of the icons I, this operation corresponds to moving that icon I. For example, when the user wants to move the icon I of "easy fax" to a position indicated by a dotted line, the user simply drags this icon I.

The display 320 additionally displays a scroll bar S1 for scrolling the screen vertically and a scroll bar S2 for scrolling the screen horizontally.

In this case, when the user touches a black triangle mark included in the scroll bar S1 or the scroll bar S2, the user is able to scroll the screen in a direction indicated by the black triangle mark. When the user moves a scroll button B1 included in the scroll bar S1 or a scroll button B2 included in the scroll bar S2 by dragging the scroll button B1 or B2, the user is able to scroll the screen in a direction of the movement. By scrolling the screen, a screen not displayed on one screen may be displayed.

The second detection region R2 is a region that is provided at a position farther from the optical detector 310 than the first detection area R1, and that is for detecting the presence of a the to-be-detected object with the use of the optical detector 310.

Accordingly, the optical detector 310 detects whether the user touches an operation target in the second detection region R2. In contrast, the optical detector 310 does not detect an action accompanying a touch, such as dragging or swiping, in the second detection region R2. An operation target is, for example, a button provided in the second detection region R2. Note that the button has no function as an electrical switch for turning on/off the power in response to pressing of the button. When the optical detector 310 detects an object of interest in the second detection region R2, it is determined that the user has touched a button located at the detected position.

Figure 6:
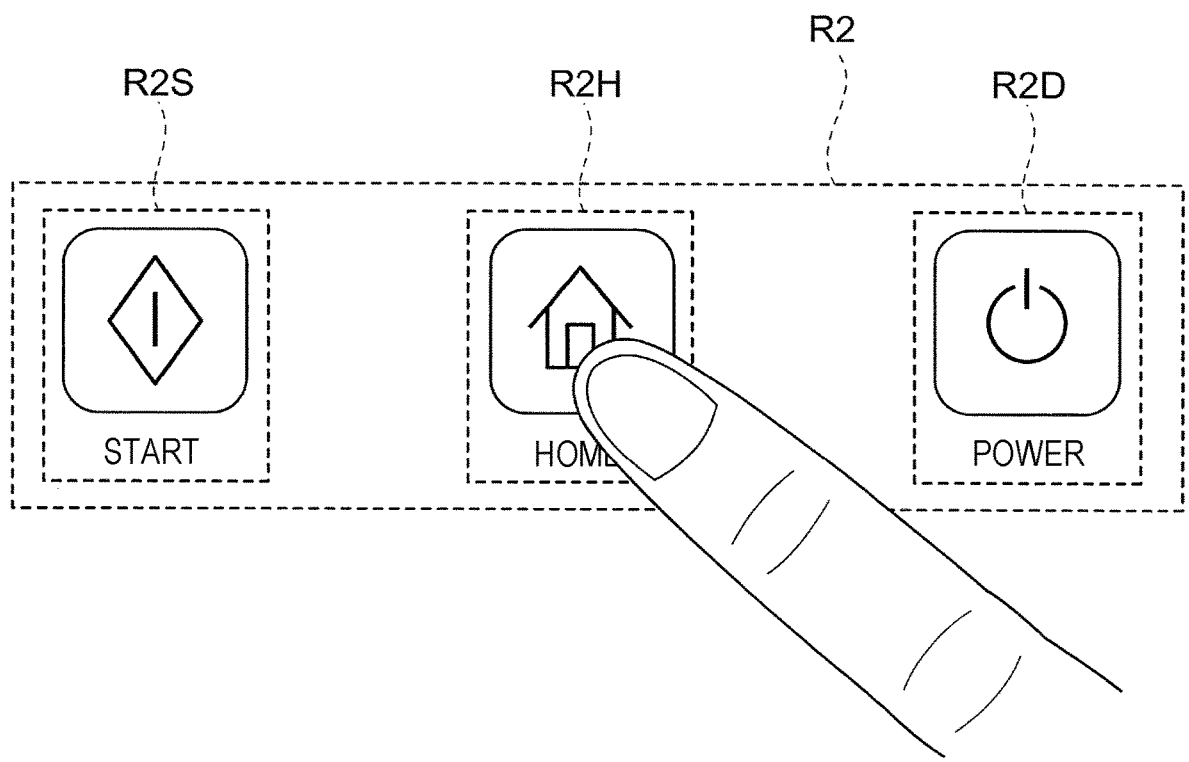
FIG. 6 is a diagram illustrating a specific example of an operation performed by the user in a second detection region.

FIG. 6 is a diagram illustrating a specific example of an operation performed by the user in the second detection region R2.

In the example illustrated in FIG. 6, three buttons are arranged in the second detection region R2. These buttons are, from the left, a start button, a home button, and a power button. The start button is a button for starting the operation of the image forming apparatus 1. The home button is a button for causing the screen of the display 320 to transition to a home screen. The power button is a button for turning on/off the power of the image forming apparatus 1. FIG. 6 illustrates the case where the user has touched the home button, among these three buttons.

In the exemplary embodiment, an identification display element with which the user is able to recognize a button that serves as an operation target is provided at a position of this button or at a position adjacent to this button. Here, a frame representing the range of the button is printed as an identification display element. In addition, a mark representing the function of each button is printed within the frame as an identification display element. Furthermore, text representing the function of each button is printed below the frame as an identification display element. In the example illustrated in FIG. 6, frames, marks, and text representing that these buttons are, respectively from the left, the start button, the home button, and the power button are printed.

Regions for determining that the buttons are touched may be the illustrated frames, or may be regions containing these frames. That is, when the user touches a position that is outside each of these frames but is within a predetermined range, it is determined that the user has touched a corresponding one of these buttons. In FIG. 6, a region R2S is illustrated as a region for determining that the start button has been touched. In addition, a region R2H is illustrated as a region for determining that the home button has been touched, and a region R2D is illustrated as a region for determining that the power button has been touched.

Note that these identification display elements are not limited to those printed. For example, these buttons may be partially made light-transmissive, and LEDs or the like below the buttons may emit light to illuminate the marks and the like. In addition, the functions of the buttons may be displayed at the lower side of the display 320. Furthermore, the marks and the like may be projected from the top.

In the exemplary embodiment, the apparatus (image forming apparatus 1) may be caused to perform a predetermined process in accordance with a detection result of detecting, by the optical detector 310, an action when the user touches the protrusion 310a of the optical detector 310. This action is, for example, an action of tracing, by the user, the protrusion 310a of the optical detector 310 with a finger or the like (sliding).

Figure 7A:
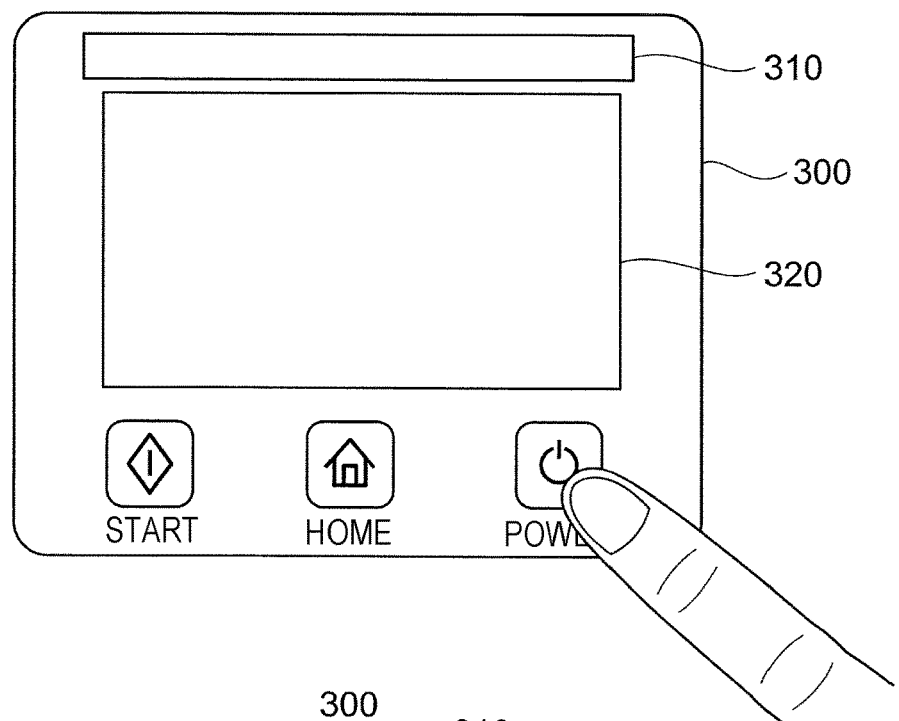
FIGS. 7A to 7C are diagrams illustrating the user's action on the user interface.
Figure 7B:
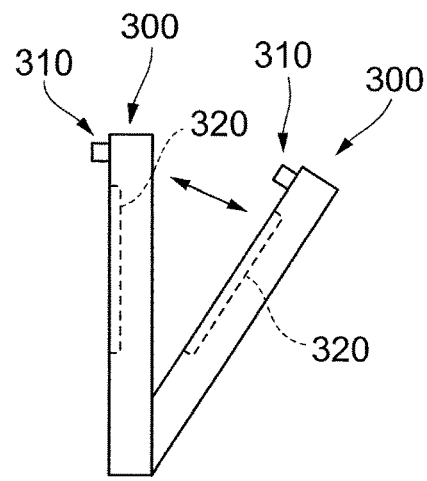
Figure 7C:
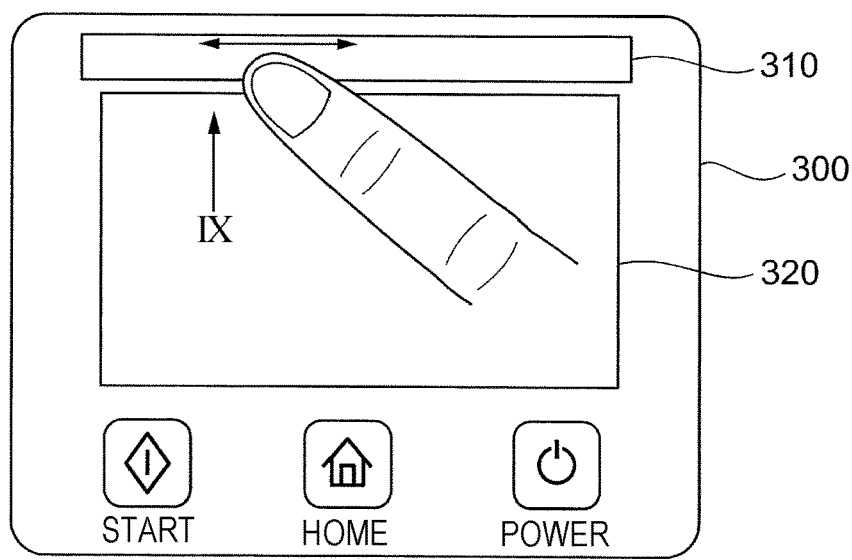

FIGS. 7A to 7C are diagrams illustrating the user's action on the user interface 300.

Among these figures, FIG. 7A illustrates the case where the user touches the power button of the user interface 300. At this time, as illustrated in FIG. 7B, there is a type of the user interface 300 that is capable of changing its angle. FIG. 7B illustrates that the angle of the user interface 300 is changeable between two illustrated states. When the angle of the user interface 300 changes, the user who is trying to touch the button may make mistakes since it becomes difficult to touch the button.

Therefore, in the exemplary embodiment, an operation based on an action of tracing the protrusion 310a of the optical detector 310 is added to make it less likely for the user to make mistakes even when the angle of the user interface 300 is changeable. In other words, this operation makes the user feel that the operability hardly changes even when the angle of the user interface 300 changes, and, as a result, it becomes less likely for the user to make mistakes. In this case, because this operation gives the function of the power button, the user's action of tracing the protrusion 310a becomes an operation of turning on/off the power of the image forming apparatus 1. Specifically, as illustrated in FIG. 7C, when the user traces the protrusion 310a rightward, the power of the image forming apparatus 1 is turned on; and when the user traces the protrusion 310a leftward, the power of the image forming apparatus 1 is turned off.

The case is not limited to that described above, and, for example, the function of a power saving cancellation button may be given as the operation of the image forming apparatus 1 realized by this action. Furthermore, for example, the function of the home button may be given, besides the power button. That is, when the user performs an operation of tracing the protrusion 310a, the screen on the display 320 is caused to transition to the home screen.

By doing so as described above, the protrusion 310a may be given the function of a switch.

As the operation of the image forming apparatus 1 realized by this action, the screen on the display 320 may be scrolled, or the intensity of contrast of the display 320 may be changed. When the image forming apparatus 1 additionally has an audio guide function or the like, this operation may be used in audio volume adjustment or the like. In this case, predetermined adjustment control may be performed in accordance with the length of a portion of the protrusion 310a traced by the user. Specifically, in the case of scrolling the screen on the display 320, the longer the length of a portion of the protrusion 310a traced by the user, the greater the amount to be scrolled. Likewise, in the case of changing the intensity of contrast of the display 320, the intensity of contrast is increased. In the case of adjusting the volume, the volume is increased.

By doing so as described above, the protrusion 310a may be given the function of a slide bar. In the case where the user traces the protrusion 310a, normally the user moves his/her finger while keeping the finger in contact with a corner of the protrusion 310a. Therefore, a reduction of the contact area reduces the frictional resistance, thereby enabling the finger or the like to move more smoothly. In doing so, it becomes easier to control the adjustment than that in the case of operating a slide bar displayed on the display 320.

In addition, other functions to be given to the protrusion 310a of the optical detector 310 include, for example, the function of a function key. In this case, the action is the user's action of touching the protrusion 310a of the optical detector 310.

Figure 8:
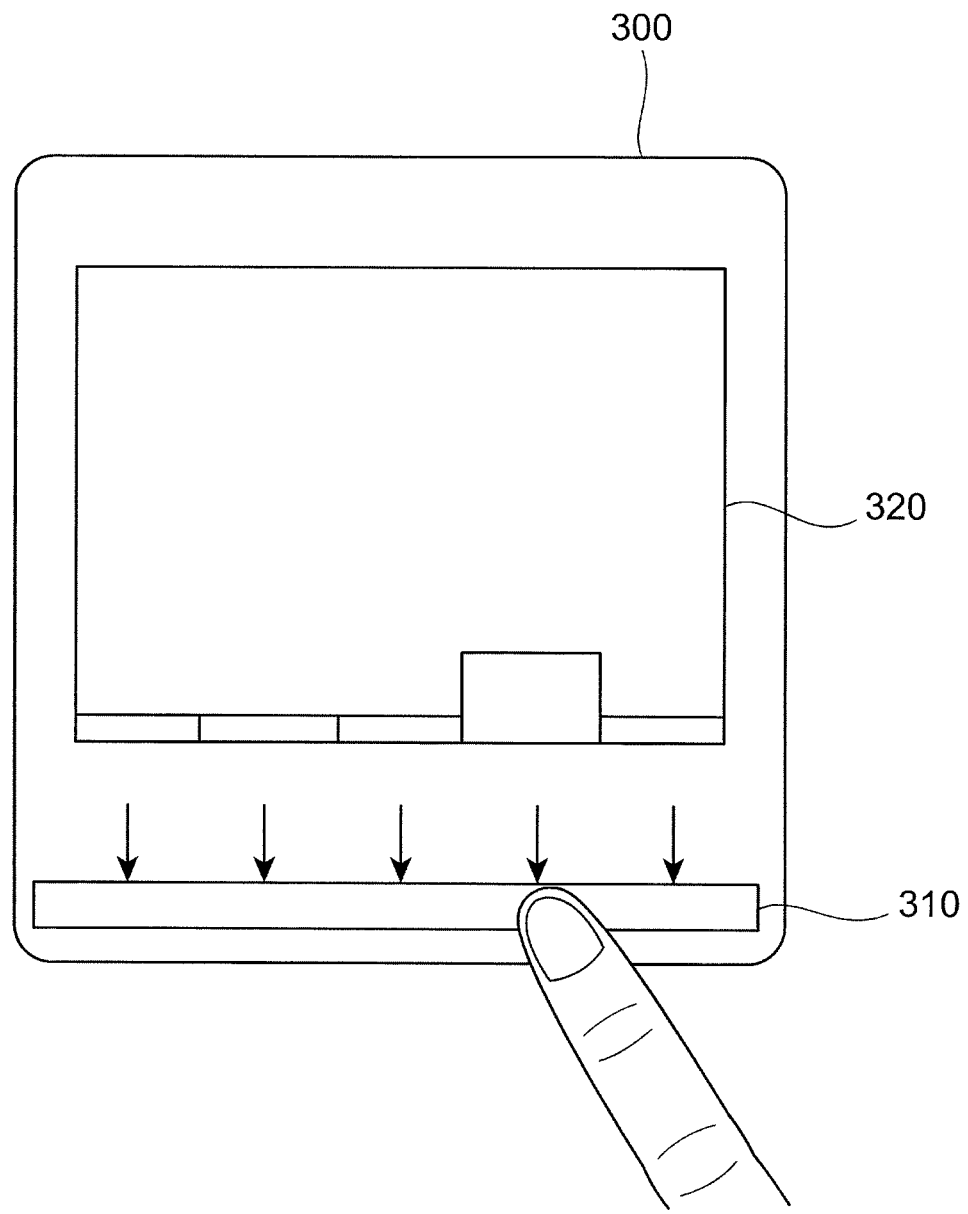
FIG. 8 is a diagram illustrating the case where a protrusion of an optical detector is given the function of a function key.

FIG. 8 is a diagram illustrating the case where the protrusion 310a of the optical detector 310 is given the function of a function key.

Here, the optical detector 310 is arranged below the display 320 from the viewpoint of improving the user's operability when using the protrusion 310a of the optical detector 310 as a function key.

In this case, a predetermined place of the protrusion 310a is associated with a predetermined process. When the user touches this place, the process associated with this place is executed. In the illustrated example, the case of touching one of five places indicated by arrows is illustrated.

It is preferable that an identification display element which corresponds to a to-be-touched place and with which the user is able to recognize an operation target be provided at a place of the optical detector 310 and/or at a place adjacent to the optical detector 310. The identification display element represents the details of a process associated with a to-be-touched place. The identification display element may be the same or similar to those described using FIG. 6. For example, an identification display element is printed at a to-be-touched place or a place adjacent to a to-be-touched place and is a mark or characters representing the details of a process. As has been described above, light emission such as a light-emitting diode (LED) or projection may be used. Furthermore, the details of a process may be displayed at the lower side of the display 320. In other words, in this case, an identification display element is displayed on the display 320 arranged adjacent to the optical detector 310.

FIG. 8 illustrates an example of the case where the details of a process are displayed at the lower side of the display 320. In this case, the simplified details of a process are indicated at the lower side of the display 320 when the user does not touch a corresponding identification display element. When the user touches the identification display element in this state, the more detailed details of the process are accordingly displayed as a pop up. FIG. 8 illustrates the case where, when the user touches the fourth place from the left, the more detailed details of a corresponding process are accordingly displayed as a pop up.

As an identification display element, the shape of the protrusion 310a may be changed at to-be-touched places. For example, although places of the protrusion 310a that the user touches are linear in the above-described example, to-be-touched places are recessed in order to make it easier for the user to touch.

Figure 9A:
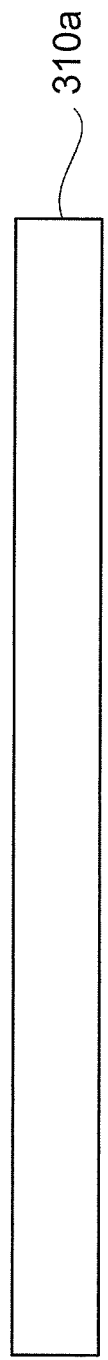
FIGS. 9A and 9B are diagrams comparing the case where the protrusion is not provided with notches at places where the user touches, and the case where the protrusion is provided with notches at such places.
Figure 9B:
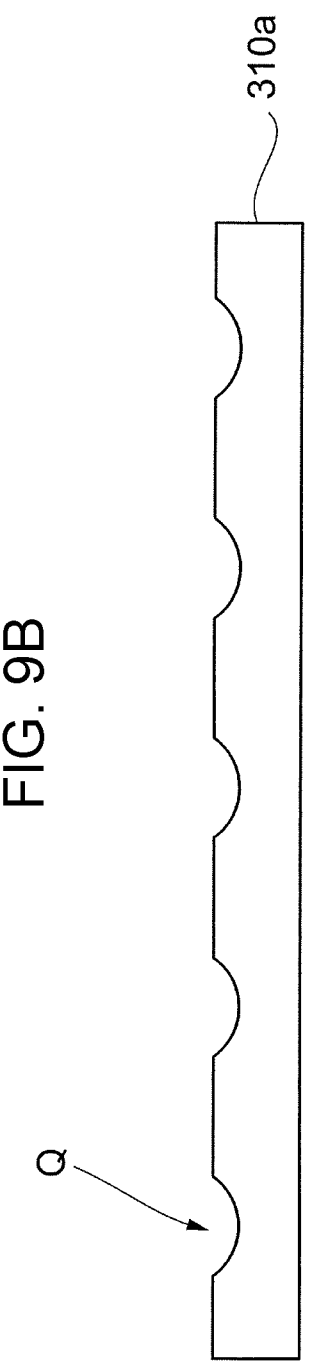

FIGS. 9A and 9B are diagrams comparing the case where the protrusion 310a is not recessed at places where the user touches, and the case where the protrusion 310a is recessed at such places. Note that FIGS. 9A and 9B are diagrams where the protrusion 310a is viewed from the IX direction of FIG. 7C.

Out of FIGS. 9A and 9B, FIG. 9A illustrates the case where no recess Q is provided, and the protrusion 310a is linearly formed. Meanwhile, FIG. 9B illustrates the case where recesses Q are provided. As illustrated in FIG. 9B, places of the protrusion 310a that the user touches are provided with recesses Q, and the protrusion 310a is recessed at these places.

By providing these recesses Q, it becomes easier for the user to recognize and touch operation targets at these places. The protrusion 310a may not necessarily be provided with recesses but may be provided with bulges.

Description of Control Device 500

FIG. 10 is a block diagram illustrating an exemplary functional configuration of the control device 500. FIG. 10 illustrates, among different functions included in the control device 500, selective functions that are related to the exemplary embodiment.

The control device 500 is an example of a controller that controls the operation of the image forming apparatus 1 including the user interface 300.

As illustrated in FIG. 10, the control device 500 according to the exemplary embodiment includes a detection signal obtaining unit 510, a position detector 520, an operation determining unit 530, and an operation controller 540.

The detection signal obtaining unit 510 obtains a detection signal from the optical detector 310. The detection signal includes information on the position of one or more light-receiving portions 312 having received light reflected from an object of interest to be detected, and information on the intensity of the light received by the light-receiving portion(s) 312.

The position detector 520 obtains the position of the object of interest on the basis of the detection signal obtained by the detection signal obtaining unit 510. The position is obtainable from information on which of the light-receiving portions 312 has/have received the light, and the intensity of the light received by the light-receiving portion(s) 312, as has been described using FIG. 4.

The operation determining unit 530 determines a user operation on the basis of the position obtained by the position detector 520. When the user contacts the protrusion 310a, the position detector 520 is able to detect both the case where the user contacts the first detection region R1 including the display 320 and the case where the user contacts the second detection region R2. In addition, the position detector 520 is able to distinguishably detect the two cases. Therefore, for example, when the user contacts the protrusion 310a, on the basis of a position obtained by the position detector 520, the operation determining unit 530 is able to determine a user operation by distinguishing the case where the user contacts the first detection region R1 including the display 320 and the case where the user contacts the second detection region R2. That is, the operation determining unit 530 determines which of, for example, touching, dragging, and swiping has been done on the display 320 as a user operation, on the basis of the position obtained by the position detector 520, as has been described above. Additionally, it is determined whether a touch has been performed in the second detection region R2.

In the case of an operation on the protrusion 310a of the optical detector 310, it is determined whether an operation of tracing or touching the protrusion 310a has been performed. In the case of an operation on the protrusion 310a, the operation determining unit 530 is able to determine that this is an operation on the protrusion 310a since the position of an object of interest to be detected such as a finger is very near and the distance to the object of interest is substantially zero. In short, when the distance to an object of interest to be detected is less than or equal to a predetermined value, this may be regarded as the case where the user contacts the protrusion 310a; and when the distance to an object of interest to be detected exceeds the predetermined value, this may be regarded as the case where the user contacts the first detection region R1 including the display 320 or the second detection region R2. In the case of an operation of tracing the protrusion 310a, the operation determining unit 530 is able to determine this operation since the position of one or more light-receiving portions 312 that receive the reflected light sequentially moves. In the case of an operation of touching the protrusion 310a, the operation determining unit 530 is able to determine this operation since the position of one or more light-receiving portions 312 that receive the reflected light does not move.

The operation controller 540 outputs a control signal on the basis of the position of the object of interest to be detected determined by the position detector 520 and the user operation determined by the operation determining unit 530, and controls the operation of the image forming apparatus 1. For example, when it is determined on the display 320 in the first detection region R1 that the user has touched the icon I of "photocopy", a screen for the photocopy setup is displayed. Furthermore, when it is determined in the second detection region R2 that the user has touched the start button, the actual photocopy operation starts. Alternatively, for example, when it is determined in the second detection region R2 that the user has touched the home button, the screen on the display 320 is caused to transition to the home screen.

In the case of an operation on the protrusion 310a of the optical detector 310, a predetermined process is performed, as has been described using FIGS. 7A to 8. At this time, the operation controller 540 may switch an image on the display 320 in accordance with a user operation on the protrusion 310a.

FIG. 11 is a flowchart illustrating the operation of the control device 500.

At first, the detection signal obtaining unit 510 obtains a detection signal from the optical detector 310 (step S101).

Next, the position detector 520 obtains the position of the object of interest to be detected on the basis of the detection signal (step S102).

The operation determining unit 530 determines a user operation on the basis of the position obtained by the position detector 520 (S103).

The operation controller 540 determines an instruction input by the user on the basis of the position of the object of interest determined by the position detector 520 and the user operation determined by the operation determining unit 530 (step S104).

The operation controller 540 further controls the operation of the image forming apparatus 1 in accordance with the instruction input by the user (step S105).

According to the above-described exemplary embodiment, the user may operate the user interface 300 with a more intuitive and simplified operation.

Although the exemplary embodiment is described using the image forming apparatus 1 by way of example in the above-described example, the exemplary embodiment is not limited to the image forming apparatus 1 and is applicable to any apparatus as long as it detects an object of interest to be detected using the optical detector 310.

Although the image forming apparatus 1 may be regarded as a detection device including the optical detector 310 and the control device 500 in the above-described example, the function of the control device 500 may be included in the optical detector 310 or the user interface 300. In that case, the optical detector 310 or the user interface 300 serves as a detection device.

Although the case of touching the first detection region R1 or the second detection region R2 has been described in the above-described example, not only a simple touch, but also a long touch may be detected. In this case, a long touch is determined when an object of interest to be detected remains unmoved at a position the user touches for a duration longer than a predetermined time period.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A detection device comprising:
a display that displays an image,
an optical detector including a protrusion that protrudes from the display, the protrusion including light-emitting portions and light-receiving portions, the optical detector detecting a position of an object of interest to be detected by receiving, with use of one or more of the light-receiving portions, reflected light that occurs when light emitted from one or more of the light-emitting portions is reflected by the object of interest to be detected, the optical detector being configured to (i) detect a case where a user contacts the display; and (ii) detect a case where the user contacts the protrusion, and wherein the optical detector distinguishably detects the case where the user contacts the protrusion and the case where the user contacts the display in accordance with an intensity of the reflected light; and
a controller that performs predetermined control on the detection device in accordance with a detection result of detecting, by the optical detector, an action when the user contacts the protrusion.

2. The detection device according to claim 1, wherein the action is an action of tracing the protrusion of the optical detector.

3. The detection device according to claim 2, wherein the controller performs predetermined adjustment control in accordance with a length of a portion of the protrusion traced by the user.

4. The detection device according to claim 1, wherein the action is an action of touching the protrusion of the optical detector.

5. The detection device according to claim 4, further comprising:
an identification display element which corresponds to a to-be-touched place and with which the user is able to detect an operation target, the identification display element being provided at a place of the optical detector and/or at a place adjacent to the optical detector.

6. The detection device according to claim 5, wherein the protrusion of the optical detector includes a recess or a bulge at a to-be-touched place as the identification display element.

7. The detection device according to claim 5, wherein the identification display element is displayed on a display arranged adjacent to the optical detector.

8. The detection device according to claim 7, wherein the identification display element is displayed as a pop up on the display.

9. The detection device according to claim 1, wherein the optical detector detects that the user contacts the protrusion when a distance to the object of interest to be detected is less than or equal to a predetermined value, and detects that the user contacts the display when the distance to the object of interest to be detected exceeds the predetermined value.

10. The detection device according to claim 1, wherein the controller switches the image on the display in accordance with a user operation on the protrusion.

11. An apparatus comprising:
a receiver that receives a user operation on the basis of a detection result detected by an optical detector that includes a protrusion that protrudes from a display, the protrusion including light-emitting portions and light-receiving portions, the optical detector detecting a position of an object of interest to be detected by receiving, with use of one or more of the light-receiving portions, reflected light that occurs when light emitted from one or more of the light-emitting portions is reflected by the object of interest to be detected, the optical detector being configured to (i) detect a case where a user contacts the display; and (ii) detect a case where the user contacts the protrusion, and wherein the optical detector distinguishably detects the case where the user contacts the protrusion and the case where the user contacts the display in accordance with an intensity of the reflected light; and
a controller that controls the apparatus on the basis of a result of the user operation received by the receiver,
wherein the controller performs predetermined control on the apparatus in accordance with a detection result of detecting, by the optical detector, an action when the user contacts the protrusion.

* * * * *